(12) United States Patent
Ogino (10) Patent No.: US 6,449,087 B2
(45) Date of Patent: Sep. 10, 2002

(54) CONFOCAL MICROSCOPE AND WIDE FIELD MICROSCOPE

(75) Inventor: Katsumi Ogino, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/767,717

(22) Filed: Jan. 24, 2001

(30) Foreign Application Priority Data

Jan. 24, 2000 (JP) ........................................ 2000-013622

(51) Int. Cl.[7] .................. G02B 21/06; G02B 22/40; G01B 11/00
(52) U.S. Cl. .................. 359/383; 359/368; 359/385; 356/372; 250/201.3
(58) Field of Search .................. 359/368, 370, 359/379, 383, 385–387; 356/609, 614, 622, 624, 630; 250/201.1–201.3

(56) References Cited

U.S. PATENT DOCUMENTS

| 4,661,692 A | * | 4/1987 | Kawasaki |
| 4,844,617 A | * | 7/1989 | Kelderman et al. |
| 5,710,662 A | * | 1/1998 | Nishida |
| 6,128,129 A | * | 10/2000 | Yoneyama |
| 6,188,514 B1 | * | 2/2001 | Saito et al. |

FOREIGN PATENT DOCUMENTS

JP   58-139107   * 8/1983

* cited by examiner

Primary Examiner—Thong Nguyen (57) ABSTRACT

A confocal microscope for observing the image of an object to be observed by scanning a spot light for illuminating the object through an objective lens, comprises an aperture stop for adjusting the numerical aperture of the objective lens; and a control unit for calculating a contrast of the image of the object corresponding to each focal position while varying the focal position of the objective lens along the direction of the optical axis so as to determine the height of the unevenness on the surface of the object from a change of the contrast, thereby setting the aperture stop to have the focal depth substantially equal to the height of the unevenness.

10 Claims, 10 Drawing Sheets

CONFOCAL MICROSCOPE AND WIDE FIELD MICROSCOPE

CROSS-REFERENCE TO RELATED APPLICATIONS

The present application claims the benefit of Japanese Patent Application No. 2000-013622 which is hereby incorporated by reference.

BACKGROUND OF THE INVENTION

1. Field of the Invention

The present invention relates to a microscope which is capable of observing a super fine structure of a specimen, and particularly, to a microscope which is capable of obtaining an image with the maximum contrast by adjusting an aperture stop to the optimal in accordance with the degree of unevenness of the surface of the specimen.

2. Description of the Related Art

When a super fine structure of a specimen is to be observed by a microscope, the resolution $\delta$ thereof can be obtained by the following expression (1):

$$\delta = \lambda/2NA \quad (1),$$

where $\lambda$ is the wavelength of an illumination light of the microscope, and NA is the numerical number of the objective lens. As seen from the expression (1), in order to improve the resolution $\delta$ of the microscope, it is required to reduce the wavelength $\lambda$ of the illumination light, or to enlarge the numerical aperture NA of the objective lens.

When an object to be observed is a living specimen such as a cell, if the wavelength $\lambda$ of the illumination light is reduced to be below the ultraviolet spectral range, the living specimen itself is damaged due to a photochemical reaction, or the like. For this reason, it is not advantageous to reduce the wavelength $\lambda$ of the illumination light but instead the resolution $\delta$ can be enhanced by enlarging the numerical aperture NA of the objective lens.

On the other hand, if an object to be observed is an inorganic substance such as a material and the resolution $\delta$ is required to be greatly enhanced, the numerical aperture NA of the objective lens is enlarged and the wavelength of the illumination light is reduced, at the same time.

For instance, in the field in which a semiconductor wafer or the like is to be observed, the scale of a fine structure, typically of an integrated circuit, is gradually reducing. Thus, a repeating periodic structure of the fine structure called a line-and-space in a semiconductor process can reach a range below 0.25 $\mu$m.

Currently, in order to observe such a fine structure, a microscope using deep ultraviolet rays having the wavelength $\lambda$ of 300 nm or less as the illumination light is used. For instance, a laser continuously emitting deep ultraviolet rays having the wavelength $\lambda$ of 266 nm, which are higher harmonics, four times as high as those emitted from Nd-YAG laser, is used as a light source, and an objective lens having a high numerical aperture NA of about 0.9 is employed, so as to obtain a resolution of about 0.10 $\mu$m.

In such a conventional microscope, if a flat specimen having less unevenness on a surface is to be observed, an image with large resolution $\delta$ and an excellent contrast can be obtained by reducing the wavelength $\lambda$ of the illumination light and by maximizing the numerical aperture NA of the objective lens.

However, when the surface of the specimen has an unevenness in height, which is substantially equivalent to a width of the specimen in a plane direction, an image with excellent contrast can be obtained more frequently with a reduced aperture stop, which is not a problem limitedly related to a microscope using deep ultraviolet rays, but becomes particularly conspicuous with a microscope having a high resolution for observing a super fine structure by employing the deep ultraviolet rays.

Figure 10:
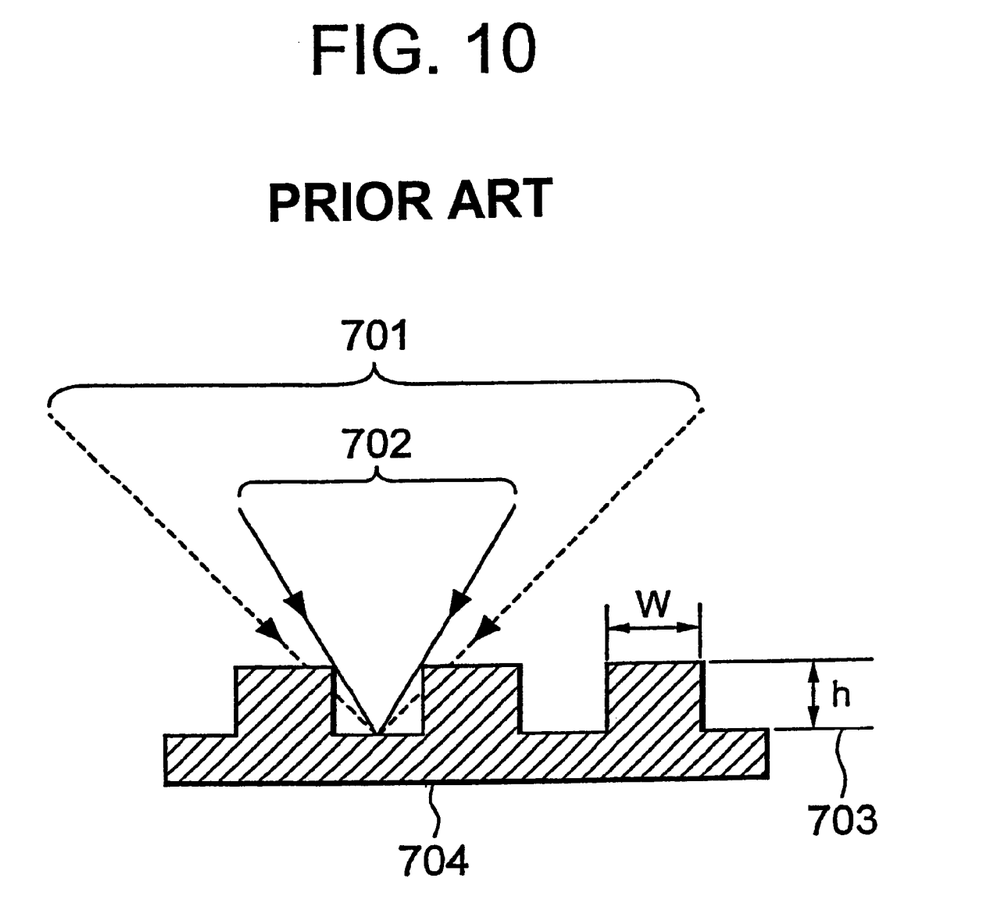
FIG. 10 is a view for explaining a relationship between the structure of the specimen to be observed and an illumination light.

FIG. 10 illustrates the above case. FIG. 10 is a cross-sectional view of a specimen 704 with the surface having unevenness (including convex portions and concave portions) in height h substantially equal to the width w thereof in the plane direction. For observing the specimen 704 by a microscope, ambient light rays of a light flux 701 having a high numerical aperture are intercepted by convex portions of a specimen (sample) 704 and fail to reach a focusing surface 703. Also, the ambient light rays of a light flux 701 are scattered on the surface of the specimen 704, so as to decrease the contrast of the image.

Accordingly, by adjusting the numerical aperture NA of the light flux 701 with an aperture stop, it is possible to enhance the contrast and the comprehensive quality of the image since, if a light flux 702, as shown in the drawing, is employed as the illumination light, there is no scattered light on the surface of the convex portions of the specimen 704.

However, a value for the numerical aperture obtaining the optimal contrast depends on a width w and a height h of the unevenness of the structure of the specimen 704. For this reason, the observer has to adjust the aperture stop through trial and error for each specimen having different width w and height h, which provides a great burden on the observer.

Moreover, in the case of a microscope having a high resolution and utilizing deep ultraviolet rays, the specimen 704 is damaged by the deep ultraviolet rays so that reducing the time for adjusting the aperture stop to the minimum is necessary.

SUMMARY OF THE INVENTION

Accordingly, an object of the present invention is to provide a microscope of high resolution for observing a super fine structure of a specimen, in which the aperture stop is set to correspond to the height of the unevenness of the surface of the specimen, so as to obtain an image with the maximum contrast in a short period of time.

In order to achieve the above object, according to one aspect of the present invention, there is provided a confocal microscope for observing, by scanning a spot light for illuminating an object to be observed through an objective lens, an image of said object to be observed, which comprises: an aperture stop adjusting the numerical aperture of the objective lens; and a control unit calculating the contrast of the image of the object in accordance with each focal position while varying the focal position of the objective lens along the direction of the optical axis to obtain the height of the unevenness of the surface of the object from a fluctuation of said contrast, thereby setting the aperture stop in such a manner that the depth of focus is substantially equal to the height of said unevenness.

According to the present invention, an image can be acquired with the optimal contrast in a short period of time since the height of the unevenness of the surface of the object is measured and the aperture stop is automatically set to have the depth of focus corresponding to the height of the unevenness of the object by using the sectioning function of the confocal microscope.

In order to achieve the above object, according to another aspect of the present invention, there is provided a wide field microscope for illuminating an object to be observed with uniform light through an objective lens to observe the image of the object, which comprises: an aperture stop adjusting the numerical aperture of the objective lens; and a control unit calculating a contrast of the image of the object while varying the aperture stop and the focal position of the object lens so as to set the aperture stop and the focal position at the positions at which the contrast becomes the maximum.

According to the present invention, since the contrast of the image of the object to be observed is calculated by varying the aperture stop and the focal position so as to automatically set the aperture stop and the focal position at the positions at which the contrast reaches the maximum, an image can be obtained with the optimal contrast: in a short period of time.

In order to achieve the above object, according to still another aspect of the present invention, there is provided a microscope for observing an image to be observed through an objective lens, which comprise: an aperture stop adjusting the numerical aperture of the objective lens; and a control unit receiving the height of the unevenness of the surface of the object so as to set the aperture stop to have the depth of focus substantially equal to the height of the unevenness.

Also, the control unit is adapted to change a set value for the aperture stop in accordance with the height of the unevenness so as to set the aperture stop and the focal position of said object lens at the positions at which the contrast of the objective image becomes the maximum.

According to the present invention, a designed value for the height of the unevenness of the object to be observed and a value of deviation from the designed value can be directly input, so as to automatically determine the depth of focus giving the optimal contrast. Accordingly, an image with the optimal contrast in a short period of time when the object has a clear profile of the unevenness and a distinct deviation such as a semiconductor device can be obtained.

DETAILED DESCRIPTION OF THE PREFERRED EMBODIMENTS

Preferred embodiments of the present invention will be described below with reference to drawings. However, these embodiments are not to limit the scope of the present invention.

Figure 1:
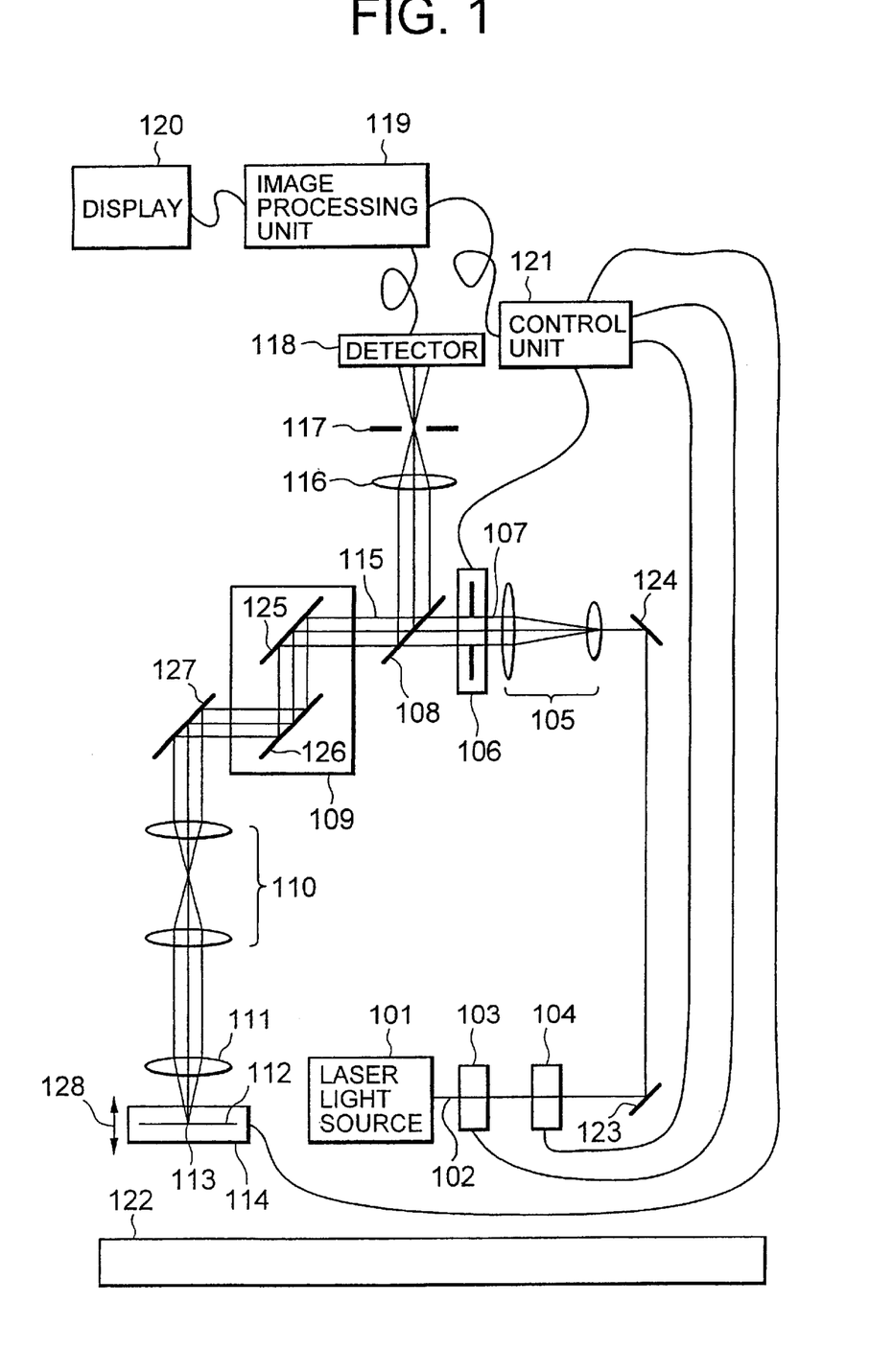
FIG. 1 is a view for showing the configuration of a confocal laser scanning microscope according to a first embodiment of present invention.

FIG. 1 is a view for showing the configuration of a confocal laser scanning microscope according to the first embodiment of the present invention. In the confocal laser scanning microscope, a pin hole is set at a confocal position to eliminate the light rays out of focus, so that the image of a specimen having unevenness can be obtained with the surface thereof at a predetermined height, which is in focus.

In the confocal laser scanning microscope, a laser beam 102 emitted from a deep ultraviolet laser 101 is passed through a shutter 103, is adjusted to have an appropriate light amount by an attenuating filter in an attenuating filter changing unit 104, and then is reflected by mirrors 123 and 124. Then, the laser beam is expanded by a beam expander 105 to a light flux 107 which fills the pupil diameter of an objective lens 111.

The light flux 107 is, after passing through an aperture stop 106 and a beam splitter 108, two-dimensionally scanned by a two-dimensional scanner unit 109 having mirrors 125 and 126 along the directions crossing to each other at right angles. Then, the light flux 107 is passed through a mirror 127 and a relay lens 110 and forms a small spot light 113 on a specimen 112 by the objective lens 111.

The specimen 112 is mounted on a specimen stage 114, and the specimen stage 114 is movable along the direction of the optical axis indicated by the arrow 128. The small spot light 113 is reflected by the specimen 112, and is passed through the objective lens 111, the relay lens 110, the mirror 127 and the two-dimensional scanner unit 109 to become a stationary light beam 115 again.

The stationary light beam 115 is reflected by the beam splitter 108, and is condensed by a condenser lens 116. Only a light, out of this stationary light beam 115, passed through the pin hole 117 is photoelectrically converted by a detector 118, and then converted by an image processing unit 119 into an image signal to be displayed on a display 120.

The confocal laser scanning microscope has the sectioning function for eliminating a light out of focus by the pin hole 117, so that, when the specimen 112 to be observed has unevenness, the contrast of the image varies with a change of the focal position. Accordingly, a position of the specimen stage 114 at which the contrast varies to reach a predetermined value is measured by an unrepresented encoder, or the like, thereby measuring the height of the unevenness of the specimen 112.

A control unit 121 is adapted to control the image processing unit 119, while controlling the diameter of the aperture stop 106 and the position of the specimen stage 114. Also, in order to reduce a damage on the specimen 112 which may be caused by the deep ultraviolet rays, the light amount of the deep ultraviolet rays is controlled by the attenuating filter changing unit 104. Further, when the damage on the specimen 112 reaches a predetermined limit value, the shutter 103 is closed to stop the application of the deep ultraviolet rays. Note that the confocal laser scanning microscope is mounted on an anti-vibration table 122 in order to secure a high image quality.

Figure 2:
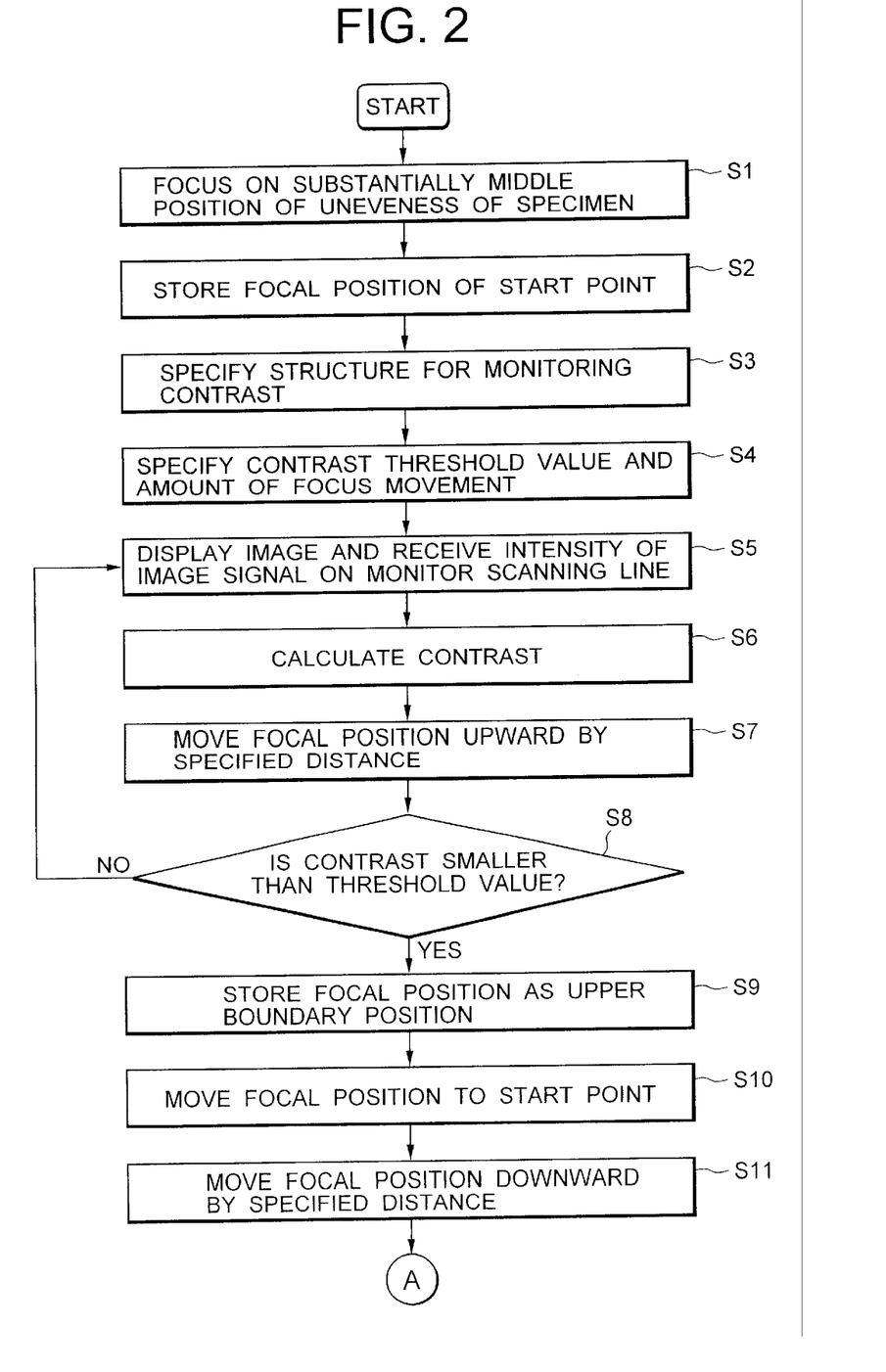
FIG. 2 is a flowchart of an operation of the confocal laser scanning microscope.
Figure 3:
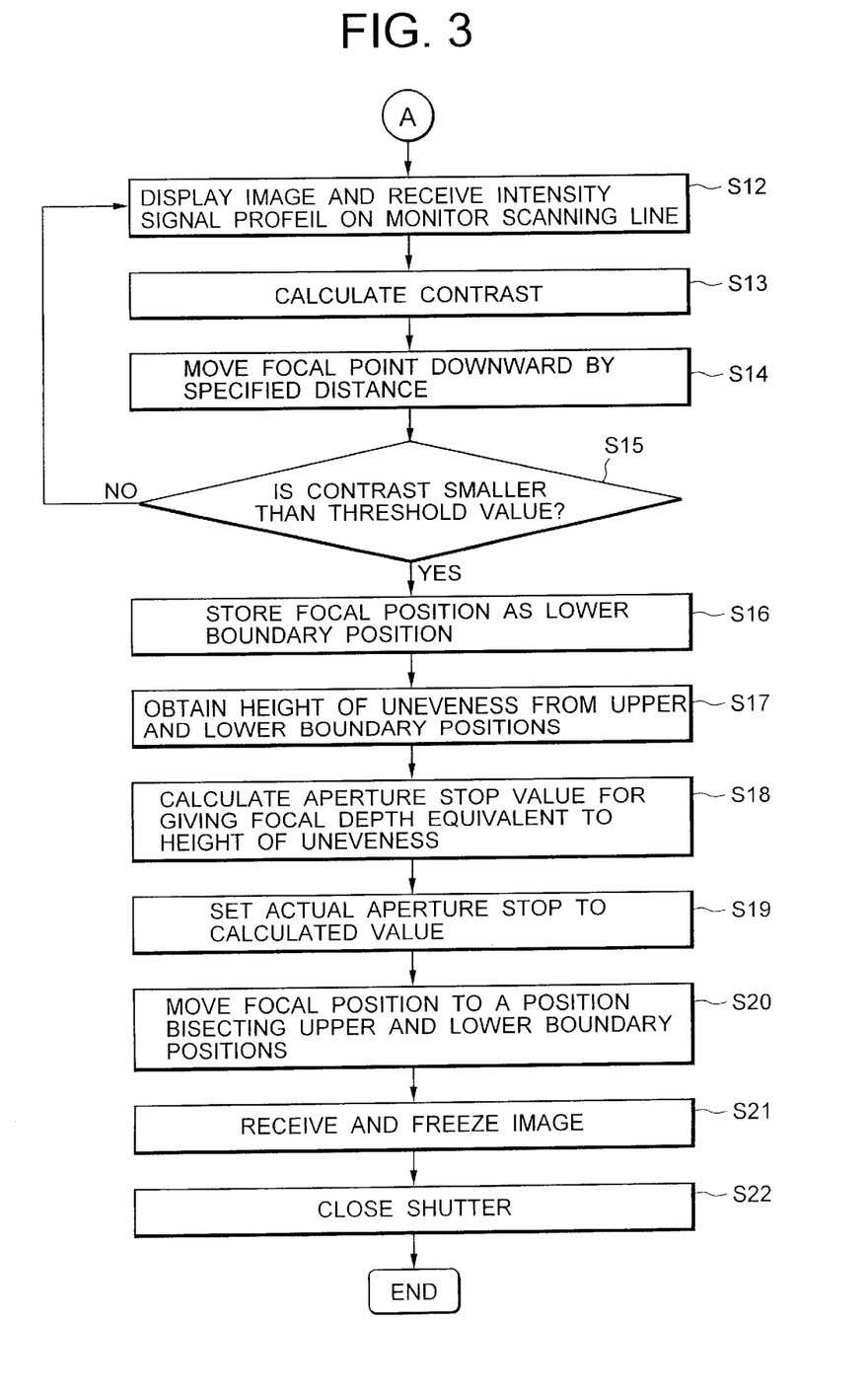
FIG. 3 is a flowchart of the operation of the confocal laser scanning microscope (sequel to FIG. 2)

Next, a description is provided of an operation for observing a specimen by the confocal laser scanning microscope of the present embodiment, with reference to the flowcharts shown in FIGS. 2 and 3. In the present embodiment, the height of the unevenness of the surface of the specimen is measured by utilizing the sectioning function described above, so as to automatically adjust the aperture stop to have the focal depth corresponding to the height of such specimen. Thus, an image with the optimal contrast can be obtained in a short period of time.

Figure 4A:
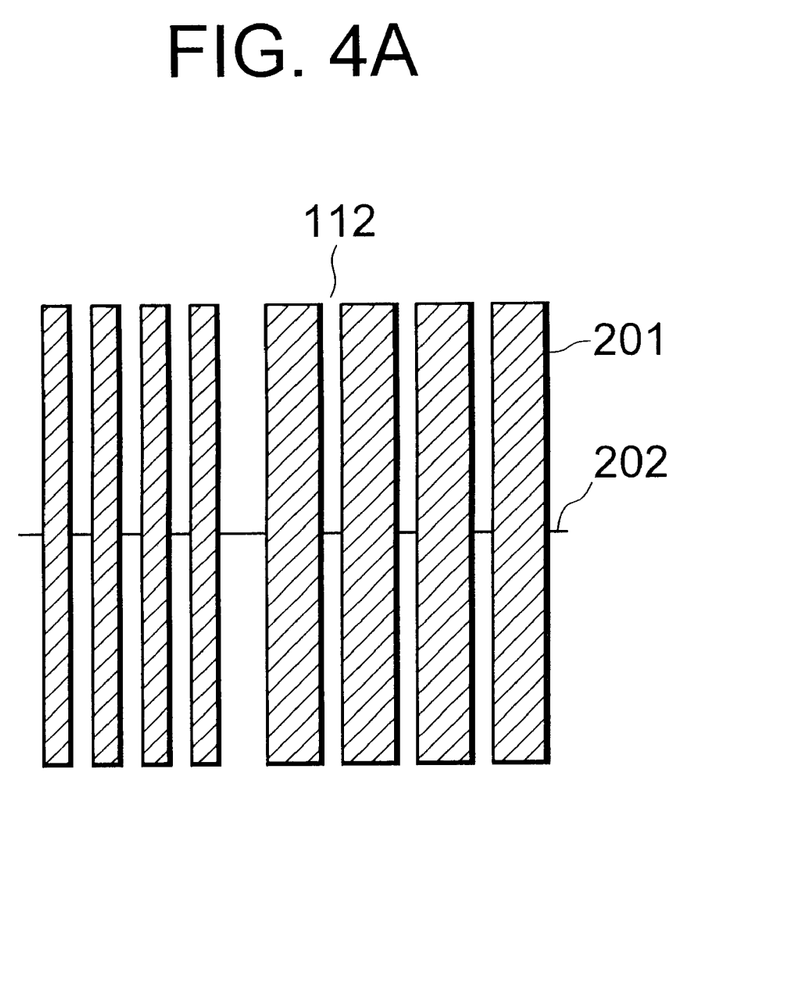
FIGS. 4A a 4B are views for explaining a specimen to be observed.
Figure 4B:
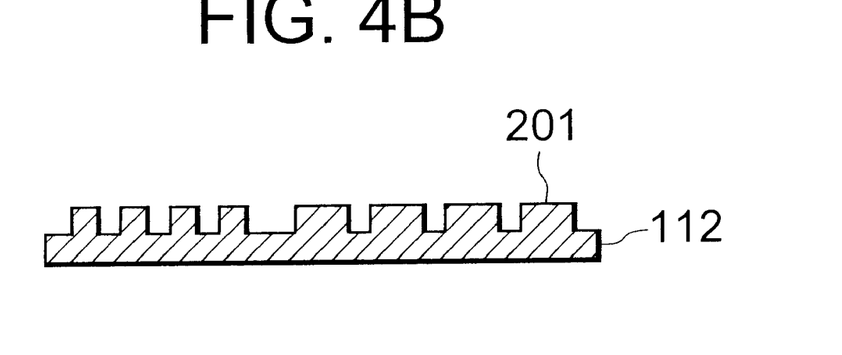

Here, the structure of a specimen to be observed will be described with reference to FIG. 4. The specimen 112 to be observed has, as shown in the plan view of FIG. 4A and in the cross-sectional view of FIG. 4B, a structure with convex and concave portions (unevenness), like a pattern structure 201 of a semiconductor wafer. In the following description, the height of the unevenness of the specimen 112 is to be obtained by measuring the intensity of an image signal along a monitor scanning line 202 shown in FIG. 4A.

As shown in the flowcharts of FIGS. 2 and 3, in order to observe the specimen by the microscope of the present embodiment, first substantially the middle position of the unevenness of the specimen 112 is focused (S1), and then the focal position is stored as a start point (S2).

Figure 5:
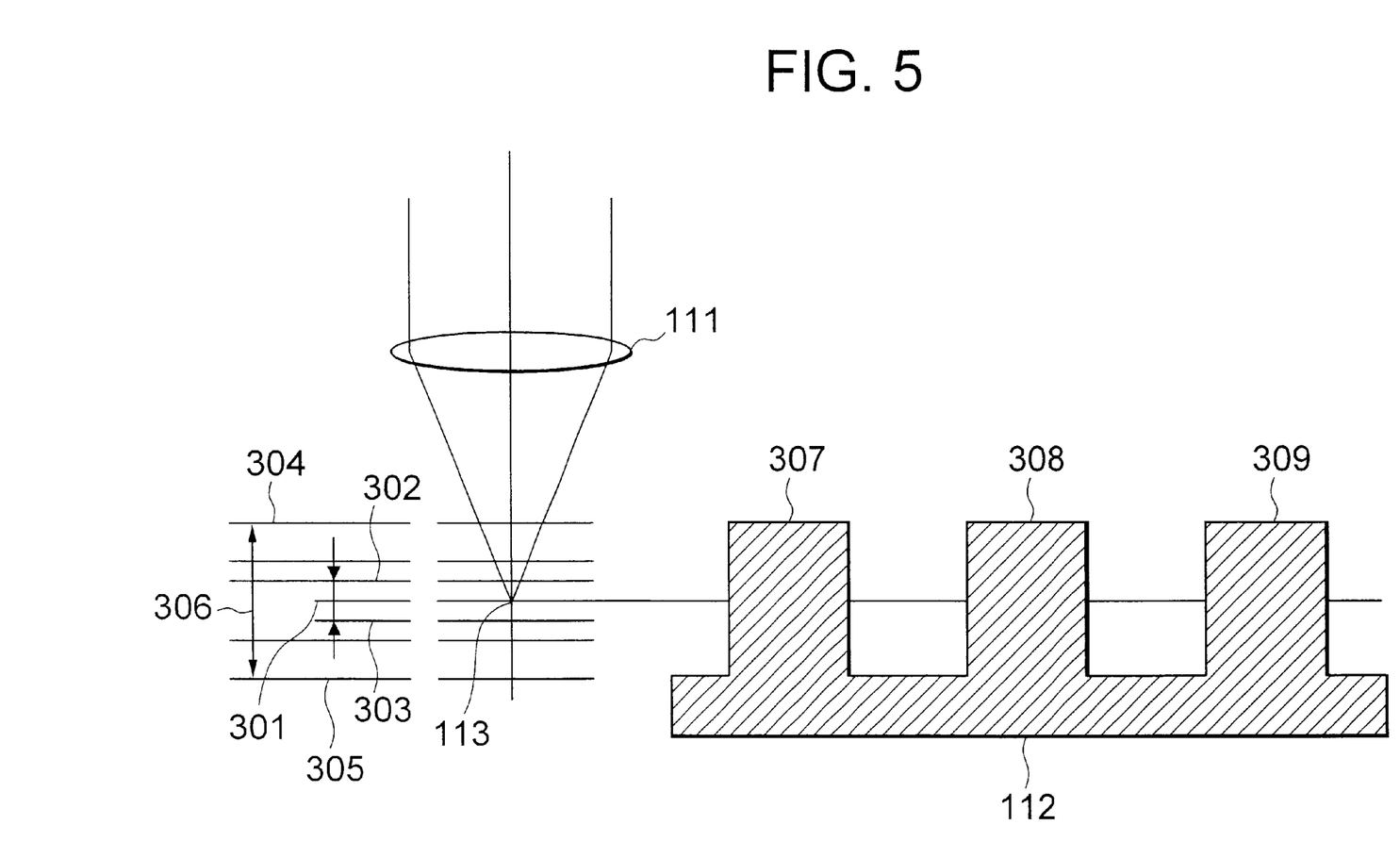
FIG. 5 is a view explaining a method of obtaining the height of the unevenness of the specimen.

The relationship between the specimen 112 and the focal position in this case is shown in FIG. 5. A small spot light 113 condensed by the objective lens 111 is two-dimensionally scanned on the surface of the specimen 112 with the focal position remaining fixed. In S1 and S2, the middle position 301 of the height of the unevenness 306 of the specimen 112 is stored in a memory of the control unit 121 as a start point on a scanning surface with respect to the direction of the optical axis.

Next, a structure for monitoring the contrast of an image is specified (S3), and then a threshold value for the contrast and an amount of focus movement are specified (S4). For instance, in case of FIG. 5, a structure 307, 308 or 309 is specified for monitoring the contrast, as a structure having a greatest unevenness in the specimen or a structure 307, 308 or 309 having a typical unevenness.

The threshold value for the contrast is, as described later, a threshold value measuring the height of the unevenness of the specimen by using a change of the contrast. Also, the amount of focus movement is an amount of movement of the scanning surface with respect to the direction of the optical axis.

Next, the surface of the specimen 112 is two-dimensionally scanned by the small spot light 113, and the image of the specimen 112 is displayed on the display 120, whereby the intensity of the image signal on the monitor scanning line 202 is received (S5).

Figure 6A:
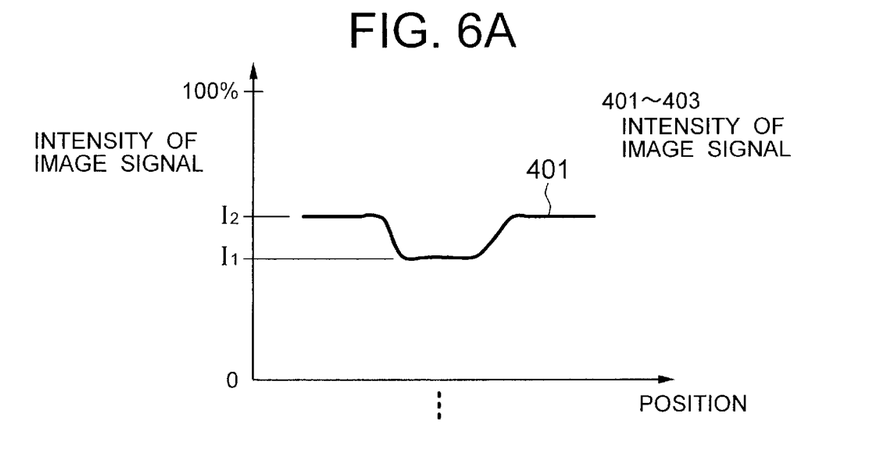
FIGS. 6A to 6C are graphs for showing changes of the intensity of an image signal with different focal positions on a monitor scanning line.
Figure 6B:
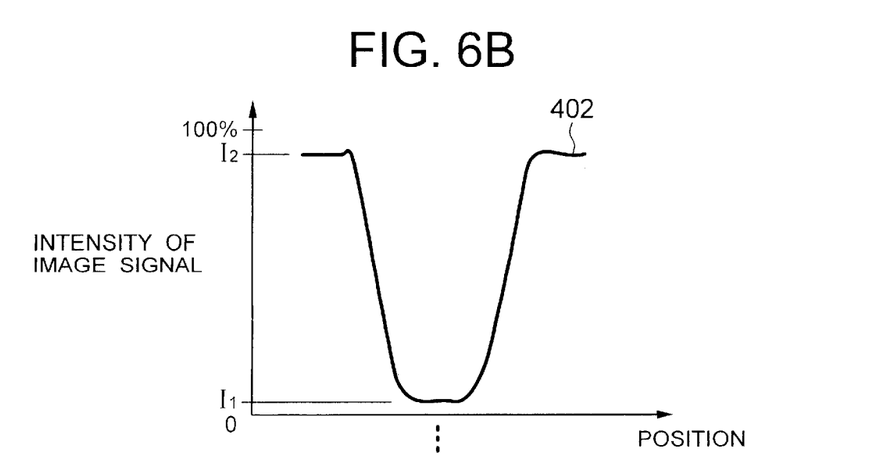
Figure 6C:
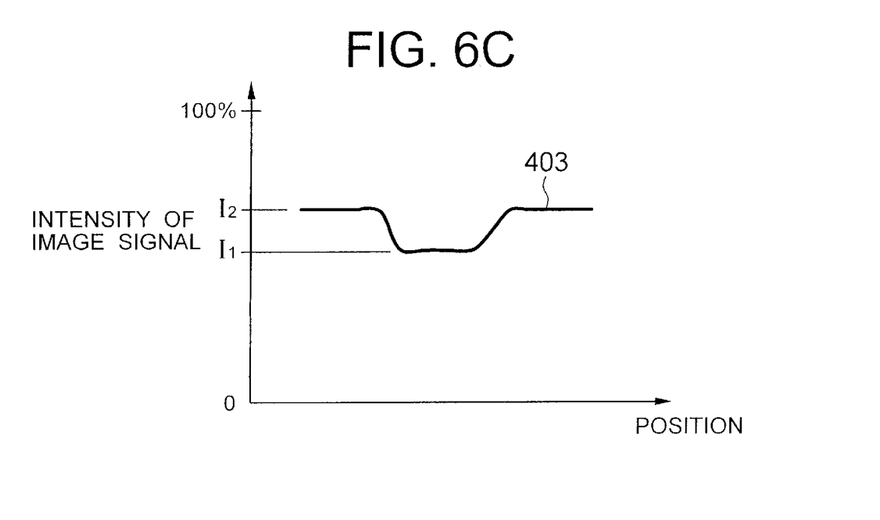

FIGS. 6A to 6C are graphs for showing changes of the intensity of the image signal along the monitor scanning line 202. Note that each of the ordinates in FIGS. 6A to 6C represents a percent of the image signal intensity. For instance, if the digital conversion of an image signal intensity is conducted in 8 bits representing 256 different levels ($2^8$ levels) then the image signal intensity of 0 having a level 0, which is the minimum signal intensity, is represented by 0%, and the image signal intensity of 255, having a level 255, which is the maximum signal intensity, is represented by 100%. Also, the abscissa in these graphs represents the horizontal coordinate of the image, that is, the position of a sampling picture element.

FIG. 6A shows a case in which the focal position is the upper boundary position 304 of the unevenness shown in FIG. 5, FIG. 6B shows a case in which the focal position is the middle position 301 of the unevenness, and FIG. 6C shows a case in which the focal position is the lower boundary position 305 of the unevenness. Note that the image signal intensities $I_1$ and $I_2$ plotted along the ordinate respectively represent the minimum value and the maximum value for the image signal intensity.

Based on the above data of the image signal intensity, a contrast C of the image will be calculated in accordance with the following expression (S6):

$$C=(I_2-I_1)/(I_2+I_1)*100 \qquad (2).$$

Next, the current focal position 301 is moved upward only by the distance specified in S4 (S7), whereby the focal position becomes, for instance, the position 302 shown in FIG. 5. In the present embodiment, the upward movement of the focal position is conducted by moving the specimen stage 114 downward, but may be conducted by moving the objective lens 111 upward. Note that the moving distance is set arbitrarily, but preferably may be one tenth as large as an estimated height of the unevenness of the specimen 112 to be observed, e.g., in a range from 0.1 µm to 0.2 µm.

Next, it is judged whether or not the contrast C calculated in S6 is smaller than the threshold value specified in S4 (S8). If the contrast value C is not smaller than the threshold value (No), the flow returns to S5 to calculate the contrast C for the second time with the focal position moved upward (S6).

On the other hand, in S8, if the contrast C is smaller than the threshed value specified in S4 (Yes), the focal position is stored in the memory as the upper boundary position 304 of the specimen 112 (S9). The threshold value may be set arbitrarily, but preferably is 10% or around.

Next, the focus is moved to the first start point 301(S10), and then the focal position is moved downward by the amount of movement specified in S4 (S11). Then, the same processings as those in S5 to S8 are conducted in S12 to S15, so as to obtain the lower boundary position 305 of the specimen 112 to be stored in the memory (S16).

In the confocal laser scanning microscope, the light is radically decreased in amount when it is deviated from the focus surface, so that the upper and lower boundary positions 304 and 305 can be obtained with accuracy. Accordingly, the height 306 of the unevenness of the specimen 112 can be obtained from a difference between the upper and lower boundary positions 304 and 305 (S17).

Next, a value for the aperture stop giving the focal depth Δ equivalent to the height 306 of the unevenness of the specimen 112 is calculated (S18), and the aperture stop 106 of the microscope is set at the calculated value (S19). In this case, the focal depth Δ is given by the following expression:

$$\Delta = \lambda/(2*NA^2) \qquad (3).$$

The optimal numerical aperture NA is obtained by varying the expression (3) to the following expression (4) for the required focal depth Δ:

$$NA=(\lambda/2\Delta)^{1/2} \qquad (4).$$

The aperture stop value also has a proportional relationship with the numerical aperture NA, and is determined one-conditionally with respect to the other optical systems.

Next, the focal position is moved to a position bisecting the upper boundary position 304 and the lower boundary position 305 (S20), and an image is received to be frozen (S21), whereby the shutter is closed (S22), to complete a series of operations. Note that in S20, the focal position may be moved to a position at which the contrast reaches the maximum.

According to the present embodiment, as described above, the height 306 of the unevenness of the surface of the specimen 112 is measured by utilizing the sectioning function, so that the aperture stop 106 is automatically determined to obtain the focal depth Δ corresponding to the height 306 of the unevenness. Thus, it is possible to obtain an image with the optimal contrast in a short time of period.

Note that in the above description the image signal intensities are latched along the single monitor scanning line 202. However, the measurement may be conducted across a plurality of scanning lines in the range of observation, so as to calculate the average of the image signal intensities, thereby enhancing the accuracy in measurement. Also in the above description, the focal position is moved upward from the initial focal position 301 and then moved downward at the time of obtaining the height 306 of the unevenness of the specimen 112. However, the focal position may be moved in a different order.

Figure 7:
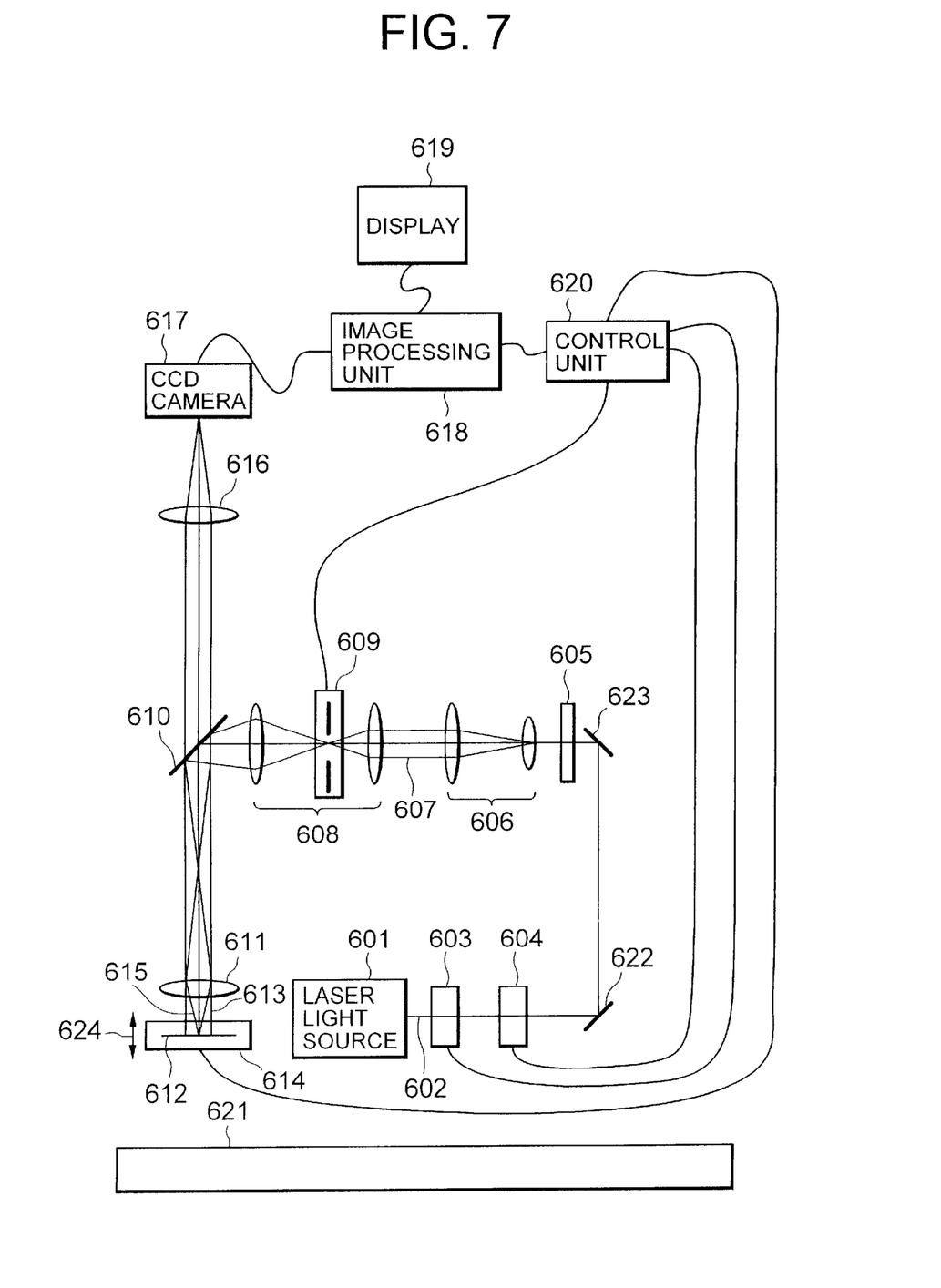
FIG. 7 is a veiw for showing the configuration of a wide field microscope according to a second embodiment of the present invention.

Next, the second embodiment of the present invention will be described. FIG. 7 is a view for showing the configuration of a wide field microscope according to the second embodiment. Though having no sectioning function, the wide field microscope can illuminate an entire specimen with uniform deep ultraviolet rays. Thus, a damage on the specimen caused by the deep ultraviolet rays is less, compared with that in the confocal laser scanning microscope illuminating a specimen with a spot light. Note that a wide field microscope is also called a Koehler illumination type microscope.

In the wide field microscope, a laser beam 602 emitted from a deep ultraviolet laser 601 is passed through a shutter 603, is adjusted to have an appropriate light amount by an attenuating filter in an attenuating filter changing unit 604, and then is reflected by mirrors 622 and 623. Then, the laser beam is turned to a two-dimensional light source beam having a limited size on a diffusion plate 605 and then expanded by a beam expander 606 to fill the pupil diameter of an objective lens 611 as an expanded light flux 607.

The light flux 607, after passing through a relay lens 608 and an aperture stop 609, is reflected by a beam splitter 610 to be turned to a uniform illumination light 613 (indicated by the solid line) uniformly illuminating a specimen 612 through an objective lens 611. The specimen 612 is mounted on a specimen stage 614, and the specimen stage 614 is movable along the direction of the optical axis indicated by the arrow 628 in the drawing in order to adjust the focal position.

The reflected light 615 (indicated by the broken line) from the specimen 612 is returned to the objective lens 611 and, after passing through the beam splitter 610, is imaged on a CCD (Charge Coupled Device) camera 617 by a second objective lens 616. The image on the CCD camera 617 is photoelectrically converted and then is converted by an image processing unit 618 into an image signal to be displayed on a display 619.

A control unit 620 is adapted to control the image processing unit 618, while controlling the diameter of the aperture stop 609 and the position of the specimen stage 614. Also, in order to reduce a damage on the specimen 612 which may be caused by the deep ultraviolet rays, a light amount of the deep ultraviolet rays is controlled by the attenuating filter changing unit 604. Further, when the damage on the specimen 612 reaches a predetermined limit value, the shutter 603 is closed to stop the application of the deep ultraviolet rays. Note that the wide field microscope is mounted on an anti-vibration table 621 to secure a high image quality.

The confocal laser scanning microscope of the first embodiment is capable of measuring the height of the unevenness of a specimen by utilizing the sectioning function, so as to automatically determine the focal depth giving the optical contrast from the height value. On the other hand, since having no sectioning function, the wide field microscope of the second embodiment is not capable of measuring the height of the unevenness of a specimen.

Accordingly, in the wide field microscope of the second embodiment, a designed value for the height of the unevenness of a specimen and an estimated amount of deviation from the designed value are directly input so as to automatically determined the focal depth giving the optimal contrast, which is feasible when the specimen is a semiconductor element, or the like, since a designed value for the height of the unevenness of the specimen is distinct, so that an image with the optimal contrast can be obtained in a short period of time by inputting such designed value.

Figure 8:
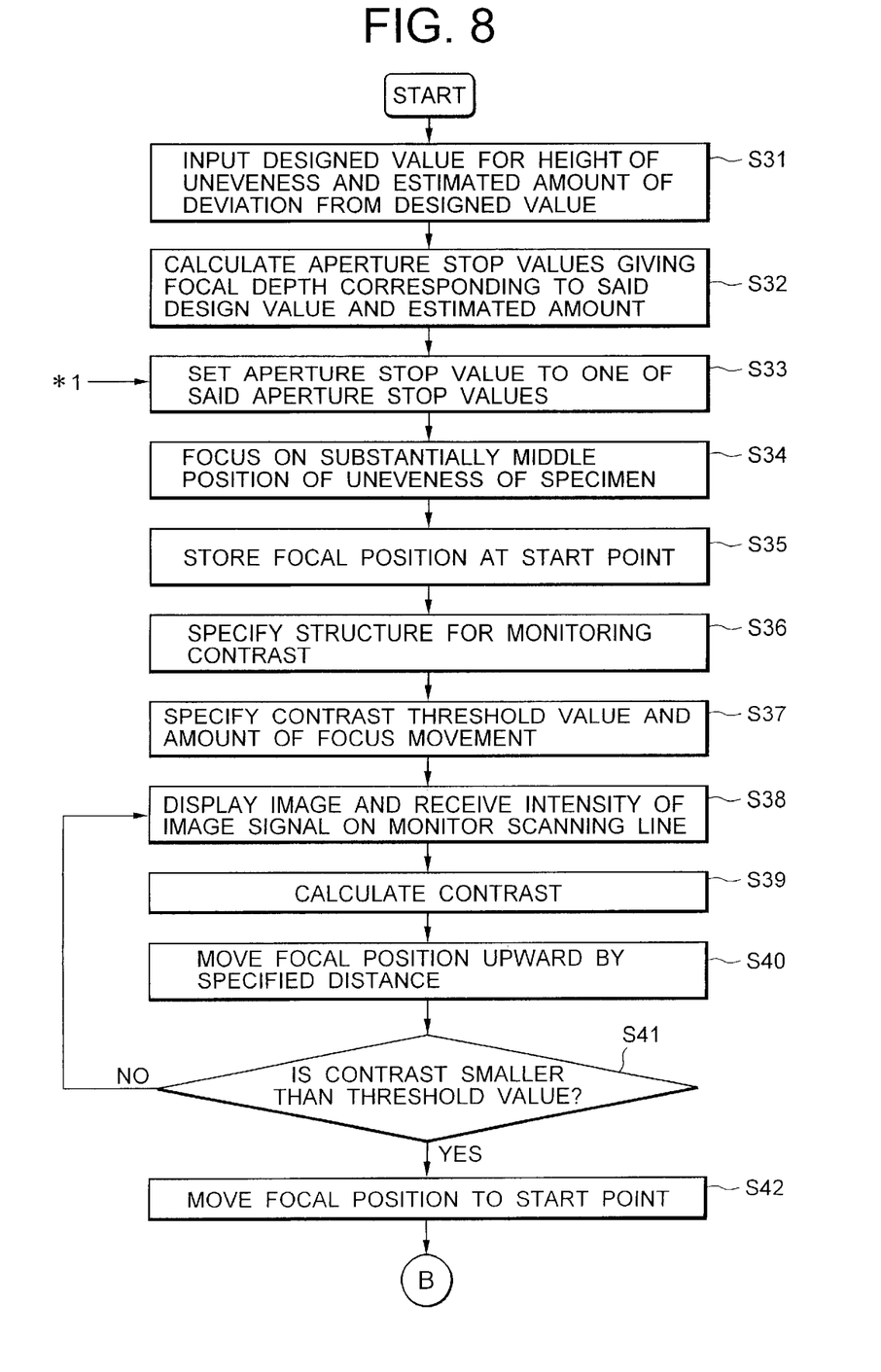
FIG. 8 flowchart of an operation of the wide field microscope.
Figure 9:
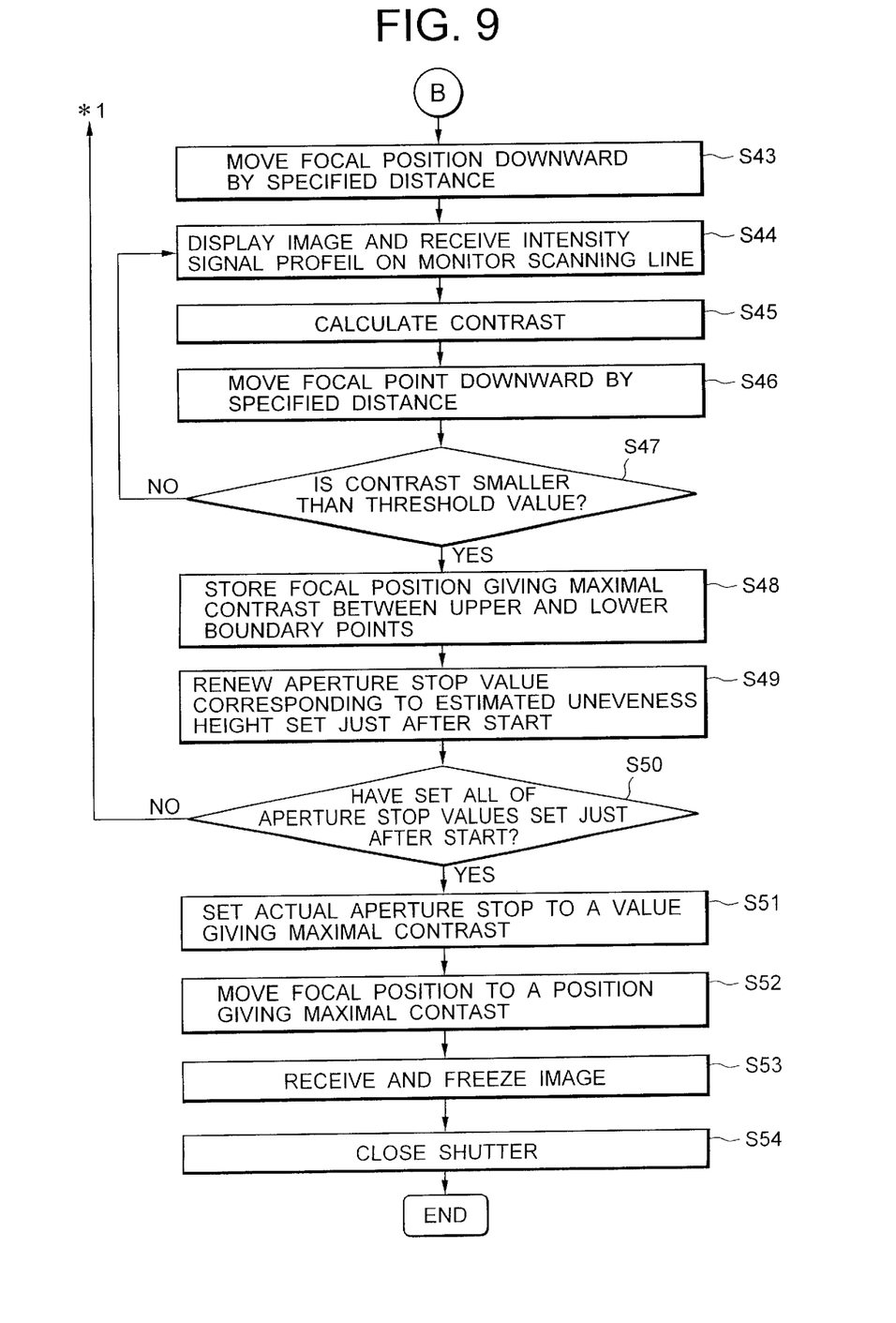
FIG. 9 is a flowchart of the operation of the wide field microscope (sequel to FIG. 8)

Next, a description is provided of an operation for observing a specimen with a known designed value for the height of the unevenness thereof according to the present embodiment, with reference to the flowcharts of FIGS. 8 and 9. In the present embodiment, first a designed value for the height of the unevenness of the specimen and an estimated amount of deviation from the designed value are input (S31).

An estimated amount of deviation is input since an actual specimen is not always prepared as designed and a value for the aperture stop giving the maximum contrast is not determined only from the designed value for the height of the unevenness. In this embodiment, it is assumed that five values are to be input, including a designed value for the height of the specimen, a value equivalent to 110% of the designed value, a value equivalent to 120% thereof, a value equivalent to 90% thereof, and a value equivalent to 80% thereof.

Next, five values for the aperture stop giving the focal depths corresponding to the above five heights are calculated (S32), and the aperture stop 609 of the microscope is set at one of the above five values (S33).

Next, in S34 to S41, like in S1 to S8 of the first embodiment, the focal position is moved upward to calculate the contrast C. Then, in S42 to S47, like in S10 to S15 of the first embodiment, the focal position is moved downward to calculate the contrast C.

Then, the focal position which gives the maximum contrast between the upper and lower boundary values is stored in a memory (S48). This combination of the focal position and the value for the aperture stop determined in S33 is one of the candidates for the focal position and the value for the aperture stop finally latching the image.

Next, the value for the aperture stop 609 of the microscope is changed to another aperture stop value which is calculated in S32 (S49). Then, it is judged whether all of the five values for the aperture stop calculated in S32 have been set for the measurement (S50).

In this case, if all of the values for the aperture stop have not been set (No), the flow returns to S33, to set another value for the aperture stop in S34 to S48, whereby the focal position giving the maximum contrast is stored.

On the other hand, it is judged that all of the aperture stop values are set (Yes), the aperture stop 609 of the microscope is set at a value which gives the maximum contrast determined by the foregoing measurement (S51), thereby moving the focal position to a position giving the maximum contrast (S52).

Subsequently, an image is latched to be frozen (S53), and then the shutter is closed (S54). Note that in the above description five values are input for the height assuming that an estimated amount of deviation for the height of the unevenness of the specimen is +or −10% to 20%. However, the operator can arbitrarily determine a range for the estimated amount of deviation in accordance with the characteristics of the specimen.

As described above, in the wide field microscope of the present embodiment, the designed value for the height of the unevenness of the specimen and the estimated amount of deviation from the designed value are directly input, thereby automatically determining a value for the aperture stop which gives the optimal contrast. As a result, when the designed value for the height of the specimen can be distinctly known, such as that of a semiconductor element, the designed value and the estimated amount of deviation therefrom are input to thereby automatically obtain an image with the optimal contrast in a reduced period of time.

Next, the third embodiment, which is a simplified modification of the second embodiment, will be described. In the third embodiment, if a specimen is prepared to have the height of the unevenness substantially equal to a designed value, that is, if an amount of deviation of the height of the unevenness is not more than +or −1% to 2% of the designed value, a value for the aperture stop is determined based only on the designed value.

According to the third embodiment, it is no longer required to calculate a focal position which gives the maximum contrast across a plurality of aperture stop values, as in the flowcharts of FIGS. 8 and 9, so that the time required obtaining the image with the optimal contrast can be further reduced, which proves to be particularly effective when a specimen is damaged very badly because of its being exposed to deep ultraviolet rays.

The scope covered by the present invention is not limited to the above described embodiments, but includes the inventions described in the foregoing claims and equivalents thereto.

In accordance with the present invention, the aperture stop is automatically determined to have the focal depth corresponding to the height of the unevenness of an object to be observed, by measuring the height of the unevenness of the surface of the object by the use of the sectioning function of the confocal microscope, so that an image with the optimal contrast can be obtained in a short period of time.

Also in accordance with the present invention, the contrast of the image of an object to be observed is calculated by varying the aperture stop and the focal position so that the aperture stop and the focal position are automatically determined to the positions at which the contrast reaches the maximum. Thus, an image with the optimal contrast can be obtained in a short period of time.

What is claimed is:

1. A confocal microscope for observing an image of an object to be observed by scanning a spot light for illuminating the object through an objective lens, comprising:

an aperture stop that adjusts an aperture of said objective lens; and a control unit that controls the aperture stop to adjust the aperture of the objective lens and calculates a contrast of the image of the object corresponding to each focal position while varying a focal position of said objective lens along a direction of an optical axis by moving the object in relationship to the objective lens so as to determine a height of an unevenness on a surface of the object from a change of the contrast, thereby setting said aperture stop to provide a focal depth substantially equal to the height of the unevenness.

2. A confocal microscope according to claim 1, wherein said control unit is adapted to set the focal position of said objective lens at a position at which said contrast becomes a maximum.

3. A wide field microscope for observing an image of an object to be observed by illuminating said object with uniform light through an objective lens, comprising:

an aperture stop that adjusts an aperture of said objective lens; and a control unit that controls the aperture stop to adjust the aperture of the objective lens and that calculates a contrast of the image of the object while varying said aperture stop and a focal position of said objective lens by moving the object in relationship to the objective lens so as to set said aperture stop and said focal position at positions at which said contrast becomes a maximum.

4. A microscope for observing an image of an object to be observed through an objective lens, comprising:

an aperture stop that adjusts an aperture of said objective lens; and a control unit that controls said aperture stop to adjust the aperture of said objective lens and receives a height of an unevenness on a surface of said object from a change in a contrast of the image so as to set said aperture stop to provide a focal depth substantially equal to the height of the unevenness.

5. A microscope according to claim 4, wherein said control unit is adapted to vary a set value for the aperture stop in accordance with a change of the height of the unevenness so as to set said aperture stop and a focal position of said objective lens at positions at which a contrast of the image of said object becomes a maximum.

6. A method using a confocal microscope for observing an image of an object, comprising:

scanning a spot light to illuminate the object through an objective lens;

controlling an aperture stop to adjust an aperture of the objective lens; and calculating a contrast of the image of the object corresponding to each focal position while varying a focal position of the objective lens along a direction of an optical axis by moving the object in relationship to the objective lens so as to determine a height of an unevenness on a surface of the object from a change of the contrast, thereby setting the aperture stop to provide a focal depth substantially equal to the height of the unevenness.

7. A method according to claim 6, further comprising:

setting a contrast at a maximum by adjusting the focal position of the objective lens.

8. A method for a wide field microscope to observe an image of an object, comprising:

illuminating the object with uniform light through an objective lens;

controlling an aperture stop to adjust an aperture of the objective lens;

varying the aperture and a focal position of the objective lens by moving the object in relationship to the objective lens;

calculating a contrast of the image of the object during said varying; and setting the contrast at a maximum by adjusting the focal position of the objective lens.

9. A method using a microscope to observe an image of an object, comprising:

illuminating the object with uniform light through an objective lens;

controlling an aperture stop to adjust an aperture of the objective lens;

varying a focal position of the objective lens by moving the object in relationship to the objective lens; and setting the aperture stop to provide a focal depth substantially equal to a height of an unevenness on a surface of said object in accordance with a change in a contrast of the image of the object.

10. A method according to claim 9, further comprising:

setting a value for the aperture stop in accordance with a change of the height of the unevenness; and setting a contrast at a maximum by adjusting a focal position of the objective lens.

* * * * *